United States Patent [19]
Martin

[11] 3,797,016
[45] Mar. 12, 1974

[54] DIGITAL MOVING TARGET INDICATOR RADAR SYSTEM INCORPORATING MODULO-N COMPONENTS

[75] Inventor: Raymond G. Martin, Ellicott City, Md.

[73] Assignee: Westinghouse Electric Corporation, Pittsburgh, Pa.

[22] Filed: Aug. 4, 1972

[21] Appl. No.: 277,937

[52] U.S. Cl............................. 343/7.7, 343/5 DP
[51] Int. Cl.............................................. G01s 9/42
[58] Field of Search........................... 343/7.7, 5 DP

[56] References Cited
UNITED STATES PATENTS

| | | | |
|---|---|---|---|
| 3,167,738 | 1/1965 | Westerfield | 343/5 DP |
| 3,713,152 | 1/1973 | Castets et al. | 343/7.7 |
| 3,706,993 | 12/1972 | Kuck | 343/7.7 |

Primary Examiner—Malcolm F. Hubler
Attorney, Agent, or Firm—D. Schron

[57] ABSTRACT

A radar system is disclosed utilizing digital techniques for implementing a moving target indicator (MTI) or pulse doppler type of radar system. More specifically, the radar system includes an MTI filter or canceler circuit for suppressing clutter signals corresponding to stationary and/or relatively slow-moving targets, while providing an output signal indicative of echo signals received from relatively fast-moving targets. The canceling circuit of this invention achieves moving target detection with digital apparatus having a capability of processing only a limited number of digital bits. The MTI filter of this invention incorporates modulo-N components having a modulus or linear range so that the minimum detectable signal of interest lies therein. The higher magnitudes of signals corresponding to echo signals received from stationary and/or slowly-moving objects will be canceled by the canceling circuit, normally. If echo signals are developed from moving targets that are of higher magnitudes than the modulus, these signals will be "aliased" by the modulo-N components about the levels N/2 and —N/2 to provide a noise-like output. Regardless of the amplitude of the echo signals derived from a relatively fast-moving target, detecting means is provided to detect the absence or presence of such signals.

10 Claims, 11 Drawing Figures

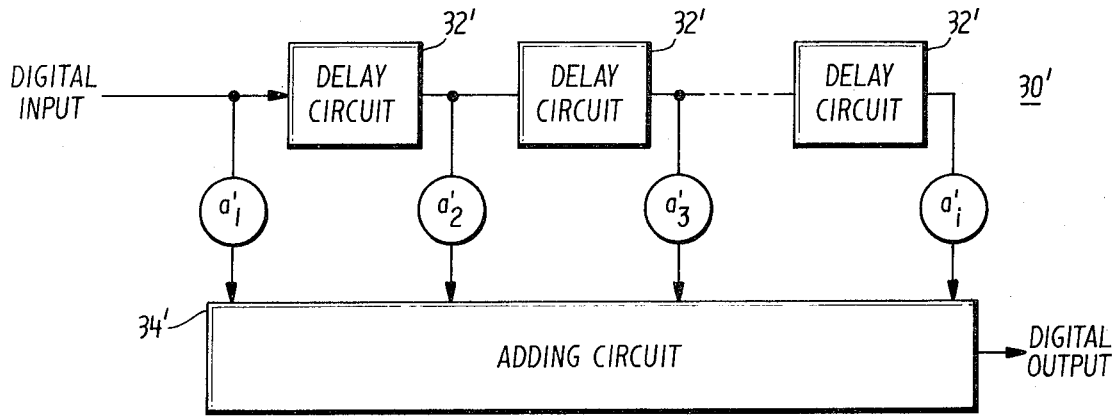
FIG. 2 PRIOR ART
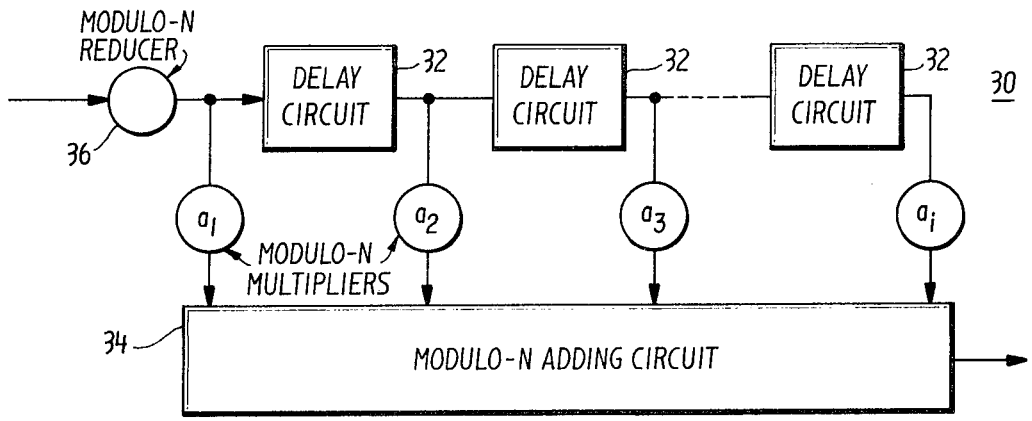
FIG. 3
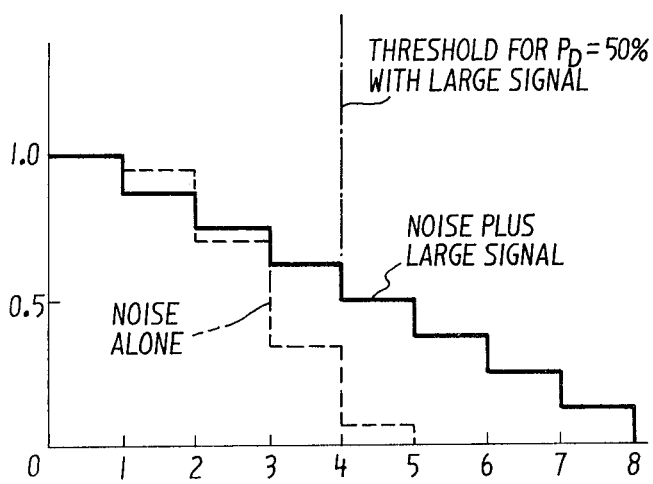
FIG. 4A WITHOUT INTEGRATION
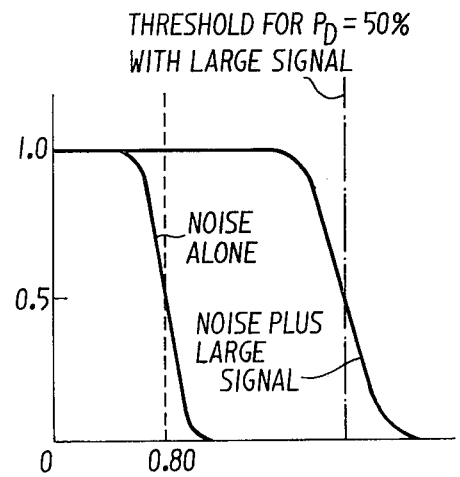
FIG. 4B WITH INTEGRATION

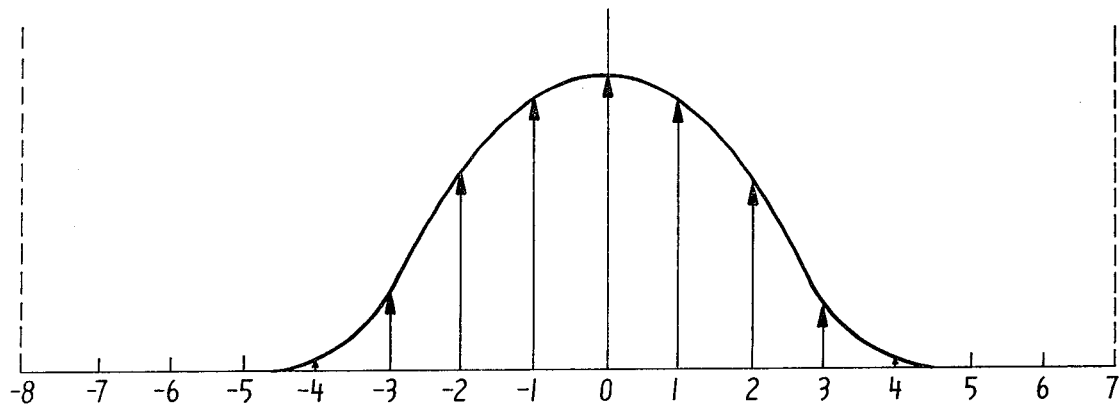
FIG. 5A  NOISE ONLY (N=16)
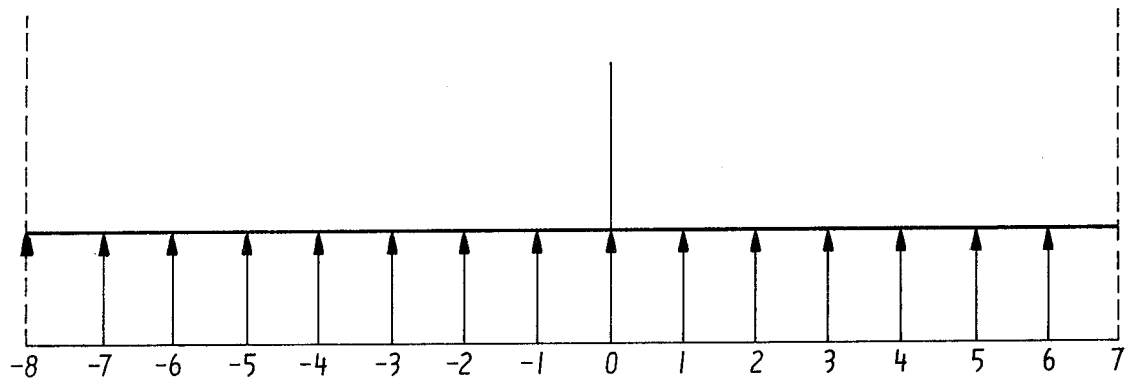
FIG. 5B  NOISE PLUS LARGE SIGNAL (N=16)
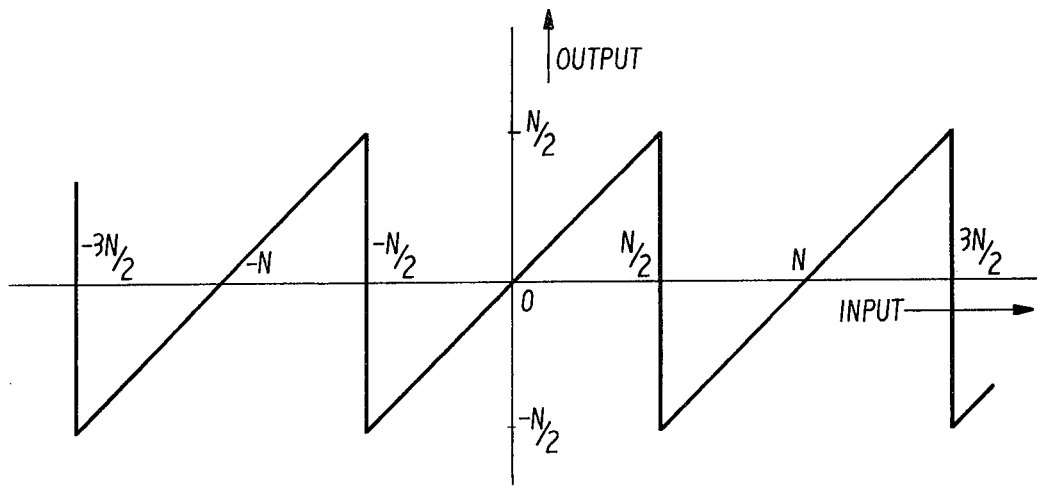
FIG. 6  MODULO-ARITHMETIC TRANSFER CHARACTERISTIC 3,797,016

DIGITAL MOVING TARGET INDICATOR RADAR SYSTEM INCORPORATING MODULO-N COMPONENTS

BACKGROUND OF THE INVENTION

1. Field of the Invention

This invention relates to radar systems and in particular to those systems incorporating digital techniques for suppressing echo signals received from relatively slow-moving and/or stationary objects.

2. Description of the Prior Art

This invention relates to radar systems capable of receiving echoes of greatly varying strength and of discriminating between echoes received from fixed or relatively slow-moving targets and from relatively fast-moving targets. The ability to discriminate involves the use of a number of received echoes from the same target; this detection process is known as "pulse doppler" or "moving target indicator" (MTI). Basically, an MTI-type radar system transmits a series of spaced bursts toward a target to be detected. The bursts of radar signals are reflected by the target(s) and are detected by the radar system, which is capable of sampling the detected echo signals at predetermined time intervals after transmission, i.e. range cells. It is apparent that the time required for the propagated bursts to travel to and to be reflected from the target, determines the distance or range of the target from the radar system. By observing the pulses received at a particular time or range cell, it may be determined whether a target is at a particular range from the radar system.

Basic to the operation of an MTI radar system is the variation or shift in frequency imparted to the return or echo signals from a moving target. This shift, known as the doppler shift, is proportional to the velocity of the target as given by the equation: $F_D=(2V)/\lambda$, where V is the velocity of the moving object, $\lambda$ is the wavelength of the transmitted signal, and $F_D$ is the change or shift in frequency. Thus, if the target is moving, the amplitude of the phase detected echo signals will vary, whereas if the target is stationary or only slowly-moving the amplitude of phase detected, successive echo signals will be substantially the same. Normally, the echo signals comprise both desired echo signals from relatively fast-moving targets and unwanted clutter echo signals, which correspond to those echo signals from relatively slow-moving or stationary objects such as buildings, other low-elevation objects, rain and the like. Typically, the clutter return or echo signals are much larger than the desired echo signals, but as indicated above, are separated therefrom in frequency. Thus, an MTI radar system is able to discriminate echo signals derived from stationary or relatively slow-moving objects due to the fact that the amplitudes of successive, phase detected echo signals therefrom change relatively slowly. Typically, MTI radar systems include canceler or filter circuits for suppressing signals at the clutter return doppler frequencies, but transmit signals at the doppler frequencies of the desired, phase detected echo signals from relatively fast-moving targets.

To implement the filtering process, the filter or canceling circuit includes means for storing, typically in "digital form", successive phase detected echo signals and then subtracting a number of these successive signals to cancel the unwanted signals derived from clutter. The amplitude of the clutter derived signal does not quickly change from signal to signal and therefore, the clutter signals are canceled by the subtraction process. However, signals received from relatively high-velocity objects such as aircraft will provide when one signal is subtracted from the next, a varying signal indicating that this signal is received from a relatively fast-moving target. Typically, the subtracting and storing circuits are constructed to handle binary signals. The binary bit capability of these circuits is typically chosen as a number M sufficient to encode all signal levels from that below the effective noise input level up to the amplitude of the largest clutter signal expected. It would not be unusual for such circuitry to be capable of handling signals encoded to 12 bits. However, it is significant that the signals of greater amplitude requiring as many as 12 bits of encoding, are those signals which are to be canceled, whereas the signals which correspond to the echo signals derived from relatively fast-moving targets which it is desired to detect, may typically be of relatively low amplitude and may be typically encoded by a significantly less number of bits, e.g. 5.

SUMMARY OF THE INVENTION

It is therefore an object of this invention to provide an improved digital MTI radar system incorporating a filter or canceling circuit of reduced complexity and bit handling capability.

In accordance with the teachings of this invention, a filter or canceler circuit is provided for an MTI-type radar system wherein modulo-N type of components are incorporated to reduce the amplitude of the input signals in accordance with a modulo-arithmetic transfer characteristic so that the minimum detectable signals of interest corresponding to the relatively fast-moving targets lies within a predetermined modulus range. In an illustrative embodiment of this invention, the input signals, comprising desired and undesired signals, are applied to a modulo-N reducer. Suitable storage means are provided for storing a number of successive signals and for combining these signals in a modulo-N adder. The successive signals are applied to the modulo-N adder through corresponding modulo-N multipliers which, in effect, multiply the signals by desired coefficients to achieve the desired cancellation within the modulo-N adder. The output signal derived from the modulo-N adder is a signal indicative only of the echo signals reflected from relatively fast-moving targets, in that the echo signals from clutter have been suppressed effectively.

BRIEF DESCRIPTION OF THE DRAWINGS

These and other objects and advantages of the present invention will become more apparent by referring to the following detailed description and accompanying drawings, in which:

FIG. 2 is a schematic diagram of a filtering or canceling circuit in accordance with the teachings of the prior art;

FIG. 3 is a schematic diagram of a filtering or canceling circuit to be incorporated into the radar system of FIG. 1, in accordance with the teachings of this invention;

FIGS. 4A and 4B show graphically the effect of incorporating the integrator circuit into the radar system of FIG. 1;

FIGS. 5A and 5B illustrate graphically the probability density of noise and noise plus large signal components, respectively, of the processed signal;

FIG. 6 illustrates graphically a modulo-arithmetic transfer characteristic as imparted to the signal to be processed by the designated component of the circuit of FIG. 3;

DESCRIPTION OF THE PREFERRED EMBODIMENT

Figure 1:
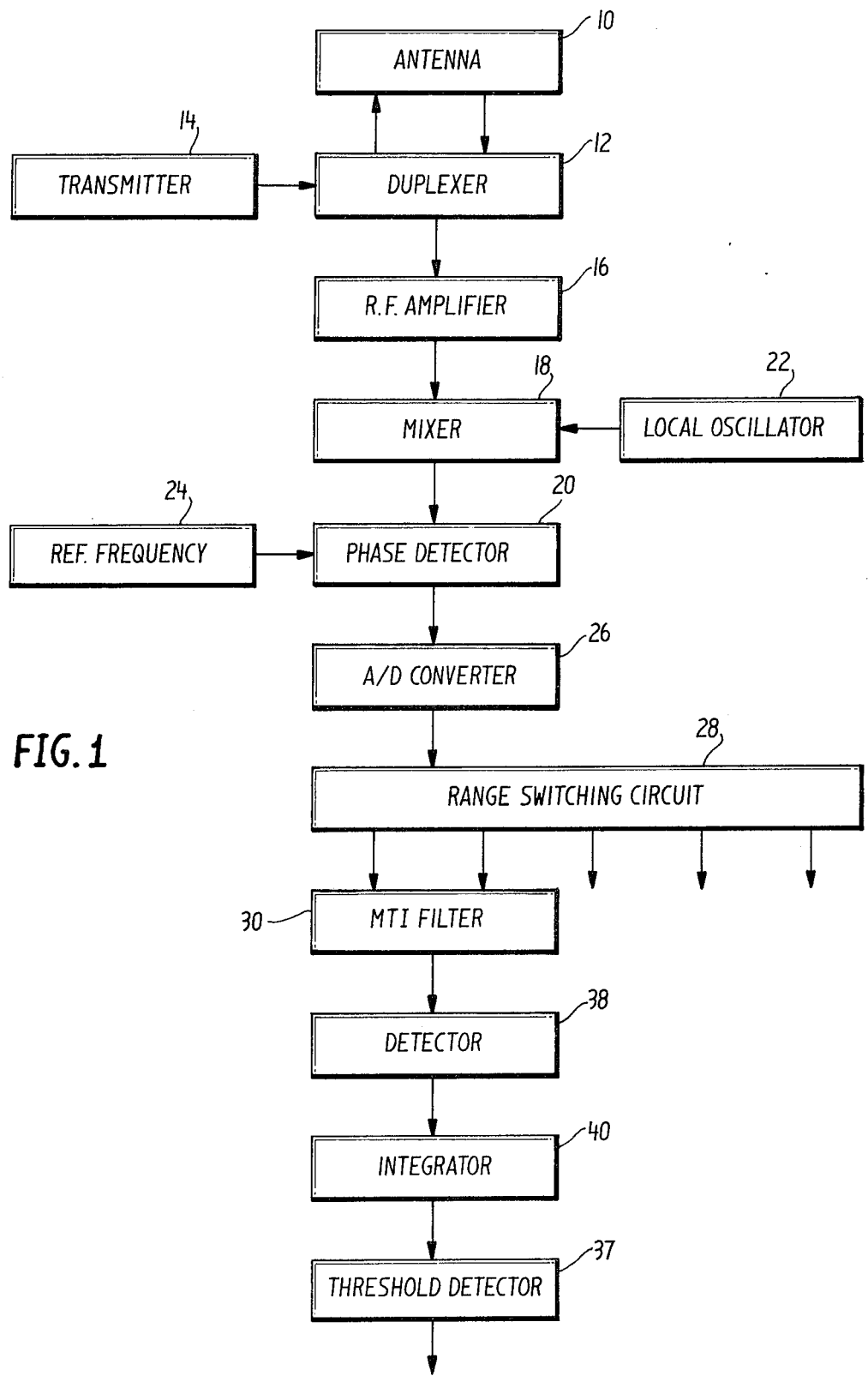
FIG. 1 is a schematic diagram of a radar system incorporating the teachings of this invention.

With regard to the drawings and in particular to FIG. 1, there is shown a radar system incorporating the teachings of this invention. In particular, there is shown a radar system for radiating a beam of electromagnetic energy from a radar antenna 10. As in a conventional system, the transmitter 14 applies a series of signal bursts through a duplexer 12 to the antenna 10. The propagated signals are reflected by objects, and the echo signals are detected by the radar antenna 10 and are selectively applied through the duplexer 12 to an RF amplifier 16. The amplified signals derived from RF amplifier 16 are of radio frequency (RF) and are converted to an intermediate frequency (IF) by a mixer 18. A reference signal, as generated by a local oscillator 22, is applied to the mixer 18 to beat the echo signals therewith; the beat signal derived by the mixer 18 is an IF signal and is applied to a phase detector 20 where the IF echo signals are combined with a reference frequency signal derived from a reference frequency source 24. The detected signals are applied to an analog-to-digital converter 26 to convert the analog input signals into corresponding digital signals. In turn, the digital signals are applied to a commutating or range switching circuit 28, which operates to sample the echo signals at predetermined intervals of time after the signal has been propagated from the antenna 10. The time required for the propagated wave to travel to the target and back to the radar system determines the distance of the target from the radar system, i.e. target range. Thus, the range-switching circuit 28 is capable of sampling the return echo signals at various predetermined times corresponding to selected target ranges of interest, the illustrated outputs from the range switching circuit 28 corresponding to preselected target ranges or range cells.

It is understood that the remaining portion of the circuit shown in FIG. 1 could be duplicated for each range cell of interest; however, only a single such processing circuit will be shown. Significantly, this invention resides in a new, improved MTI filter 30, which serves generally to suppress clutter signals derived from relatively slow-moving or stationary objects.

With regard to FIG. 2, there is shown a filter or canceling circuit 30' of the prior art. As shown, the digital input comprised of a series of phase detected echo signals, is applied to a delay line composed of a plurality of delay circuits 32' for introducing successive delays to the echo signals. The successively delayed signals are each multiplied by selected coefficients by multiplying circuits $a'_1$ to $a'_t$. The multiplied signals are then applied to an adding or summing circuit 34' to provide a suitable output signal. The digital input signal normally comprises the sum of signals derived from relatively fast-moving targets and from those unwanted clutter return signals corresponding to relatively slow-moving and/or stationary objects. Typically, the clutter signals are of a significantly greater amplitude than the wanted signals, but may be discriminated against upon the basis of frequency. The filtering circuit operates as a filter by combining successive signals with appropriate coefficients such that a signal of relatively slowly changing amplitude will be canceled. For example, in the simplest form of a canceling circuit, a single delay circuit is used and the delayed signal is simply subtracted from the presently available signal such that if the successive signals are of the substantially equal amplitude, the output of the adding or summing circuit 34' will equal a zero (or DC) voltage. In order to improve the discriminating characteristics of such filter circuits, additional delay circuits and coefficient multiplying circuits may be added. Illustratively, in a three-pulse adder, the coefficients may be selected to be, in order, 1, −2, and 1, and for a four-pulse adder, the coefficients may be selected to be 1, −3, 3 and −1. The use of such coefficients will combine the successive signals in a manner to cancel those unwanted clutter signals of relatively slowly changing amplitude. However, if a series of echo signals is received from a relatively fast-moving target, the output of the adding circuit will vary, illustratively, in the range of 500–1000 Hz, depending upon the various radar parameters, primarily the transmitter frequency.

In mechanizing a filter or canceling circuit of the prior art, it was usual to employ digital representations with a sufficient number of bits to encode all signal levels from somewhat below the effective noise input level, up to the amplitude of the largest clutter signals expected. As a result, the delay circuits, multipliers and adders required a relatively high number of bits, thus adding to their complexity and cost; typically, this apparatus was constructed to handle as many as 12 bits.

It is a significant recognition on the part of this invention that the signal from such filter circuits, from which the clutter signal components are canceled, have an amplitude which is much smaller than the input signal and can typically be represented with desired accuracy by a number of bits, e.g. five bits, less than that used to encode signals of the prior art. With regard to FIG. 3, there is shown a filter or canceler circuit in accordance with the teachings of this invention, incorporating modulo-N components. In particular, the digital input signal, in accordance with the teachings of this invention, is applied to a modulo-N reducer 36 which reduces the amplitude of the input signal into a linear range or modulus in accordance with a modulo-arithmetic transfer characteristic as shown in FIG. 6. Thus, if the input signal has an amplitude greater than $N/2$ or lower than $-N/2$, the output signal from the modulo-N reducer 36 is converted to a value between $N/2$ and $-N/2$. For example, if the input signal equaled $¾N$, the corresponding output signal would be $-N/4$. In effect, the modulo-N reducer 36, as well as the other modulo-N devices, operates upon an input number outside the modulus range to successively add or subtract (depending upon whether the input signal is above or below the modulus range) a quantity equal to the modulus range from the input until the input number is within the modulus range, this final processed number corresponding to the output signal of the modulo-N reducer 36. In concrete terms, if the input signal had a magnitude of 35 for a modulus range of 32, the modulo-N reducer 36 would operate upon such an input signal to subtract therefrom a quantity 21 to provide an output signal having an amplitude of $-11$. The modulus or linear range of the modulo-N reducer is chosen such that $N = 2^n$ for the binary digital case where n equals the number of bits upon which the various apparatus of this circuit are capable of operating. In the illustrative example where the amplitude of the input signal may be accurately represented by five bits, the corresponding modulus range would be equal to $2^5$ or 32.

The series of echo signals derived from the modulo-N reducer 36 is applied in sequence to a plurality of delay circuits 32 to successively delay the incoming echo signals. Illustratively, the delay circuits 32 may take the form of shift registers; it is particularly noted that one significant advantage of this invention is that the structure of the delay circuits 32 may be such as to store only a limited number of digital bits as compared with the delay circuit 32' of the prior art whose structure was adapted to accommodate a larger number of bits corresponding to the amplitude of the largest expected clutter signals.

The delayed echo signals are applied to a plurality of modulo-N multipliers $a_1, a_2, a_3 -- a_i$ for combining or multiplying the delayed signal with selected coefficients so that when the delayed signals are multiplied, the signals of relatively slowly changing amplitude corresponding to relatively slow-moving and/or stationary objects will be canceled. The signals derived from the modulo-N multipliers are applied to a modulo-N adding circuit 34, where the various multiplied signals are combined to suppress the clutter signals. A modulo-N adding circuit or multiplier circuit operates in the same was as the conventional arithmetic adder or multiplier, except:

1. If the output sum $\Sigma_\infty$ of the arithmetic adder or multiplier would be less than $-N/2$, then the $\Sigma_n$ of the modulo-N adder or multiplier will be ($\Sigma_\infty + kN$), where $k$ is the smallest integer such that ($\Sigma_\infty + kN$) is greater than $-N/2$; and 2. If $\Sigma_\infty \geq N/2$, then $\Sigma_N = (\Sigma_\infty - jN)$ where $j$ is the smallest integer such that $(\Sigma_\infty - jN) < N/2$.

In terms of the operation of 2's complement binary adders, a modulo-N adder or multiplier is nothing more than an n-bit adder or multiplier, where $N = 2^n$, where $n$ equals the number of bits of which these devices are capable of handling. Generally, it may be seen that the operation of the circuit of FIG. 3 is similar to that of FIG. 2, provided that the weighting constants $a_1, a_2 -- a_i$ are interger numbers. Basically, each of the modulo-N devices operates similarly to a normal device, with the exception that the additional function of converting the process signal in accordance with the transfer characteristic shown in FIG. 6 is carried out.

It may be understood that the amplitude of the input signals applied to the modulo-N reducer 36 is, in general, many times greater in amplitude than N, due to the presence of the unattenuated clutter return signals. Thus, the inclusion of the modulo-N reducer as described above causes the operation of the circuit of FIG. 3 to differ from that of the corresponding circuit of FIG. 2 by the significant addition of step function sequences of numbers in a manner similar to that of the transfer characteristic of FIG. 6. With regard to the equations given above, each input signal change which is such as to require the use of a different integer $j$ or $k$ in the modulo-N reducer operation, effectively results in the addition of a positive (or negative) step function sequence of integer amplitude equal to N times the change in $j$ or $k$, which is usually of unity magnitude. The step function response of the remaining circuit following the modulo-N reducer is identically zero provided that the weighting coefficients of the modulo-N multipliers $a_1, a_2 -- a_i$ are integers, as is easily seen by replacing the modulo-N adder 34 by an arithmetic adder 34' and noting that the step function response is then a sequence of pulses whose amplitudes are integer multiples of N. Thus, the presence of the step function sequences has no effect on the output. Similarly, the operation of each of the modulo-N multipliers $a_1, a_2 -- a_i$ is equivalent to that of the arithmetic multipliers of the circuit of FIG. 2 with the significant addition of appropriate integer amplitude step function sequences similar to that shown in FIG. 6. The system responses to step function sequences from these additional points to the output are also identically zero.

With regard to FIG. 1, the output signal derived from the MTI filter 30, as described above, is substantially free of signals relating to clutter echoes and takes the form of an AC bi-polar video signal of a frequency, illustratively, in the range of 500–1000 Hz. This signal is applied to a detector 32, which essentially operates as a rectifier upon the AC signal. In turn, the detected signal is applied to an integrator 34, which integrates the detected signal to provide a DC output whose amplitude is indicative of the presence or absence of a relatively fast-moving target. The integrated signal is then applied to a threshold detector 37, whose threshold level is set to determine whether the return echo signals correspond to a relatively fast-moving target such as an airplane. If the amplitude is above the predetermined level, there is an indication that such a target has been detected. Significantly, the predetermined level of the threshold detector 37 is set to distinguish against thermal noise due to the random electron motion of the various components of the radar system. As will be explained in greater detail later, the amplitude of thermal noise has a random distribution with occasional pulses of an amplitude that might be interpreted as identifying a relatively fast-moving target. Thus, the threshold or predetermined level of the detector 37 is set to discriminate or suppress a given percentage of the thermal noise signals. Thus, the threshold level of the detector 37 may be set to a height to exclude all but an acceptable number of false alarms generated by high amplitude thermal noise. However, as the threshold level is set higher, the sensitivity of the radar system to detect relatively fast-moving targets of interest decreases and there is a trade-off between sensitivity and the occurrence of false alarm signals. Illustratively, one part error in $10^8 - 10^{12}$ parts would be acceptable.

Thus, the output signal derived from the threshold detector 37 is indicative of the presence or absence of a desired target return signal and random noise, or the noise alone. When the target echo signal is sufficiently large with respect to the noise component, this decision can be made correctly with a high probability of success. Thus, the modulus or linear range N for the circuit shown in FIG. 3, must be large enough to provide for this type of operation. Significantly, it is not necessary for the N to be substantially larger than that peak-to-peak value of the output signal including the noise component, which provides an adequate probability of detection. In one illustrative embodiment, it has been found that a modulus of 32, i.e. a system incorporating digital components capable of handling five bits, will provide the desired probability of detecting target echo signals of interest. In the system as described above, a modulus N of 16 was found unacceptable because it was not possible to differentiate adequately between the presence and absence of moving targets of interest due to the effects of receiver thermal noise.

The operation of the described modulo-arithmetic MTI filter depends on its parameters being elected such that, in the absence of a signal, the MTI filter output lies predominantly within the linear range near the origin of the modulo-arithmetic transfer characteristic as shown in FIG. 6. Under these conditions, the output signal will comprise thermal noise and low-level clutter residue, having a probability density consisting of a cluster of integer-spaced delta functions, usually having an approximately zero-mean gaussian shape as shown in FIG. 5A. When a large amplitude signal is present, the probability density function changes radically and approximates an array of delta functions uniformly distributed between the upper and lower modulus levels as shown in FIG. 5B. This uniform distribution results from the fact that the signal is heavily aliased by the modulus level so that antenna modulation, or other causes of signal level fluctuation, result in an essentially random output from the MTI circuit. If the output derived from the MTI filter 30 is fed into a simple linear detector and threshold detecting circuit, the characteristics of interest are the corresponding distribution functions of the input to the threshold detector, which are of the form shown in FIG. 4A. In the case where the signal has a very large amplitude, the distribution function decreases in an approximately linear fashion from zero to N/2, where N is the modulus level. A requirement for some particular probability of detection ($P_D$) thus determines the necessary threshold setting in terms of the modulus level, e.g. a threshold of N/4 for $P_D$ = 50 percent, as shown in FIG. 4B. The corresponding false-alarm rate is then determined from the level of the distribution function, for the noise-alone case, at that threshold level. Clearly for the large signal case, the false-alarm rate will depend on the ratio of the standard deviation of the noise to the modulus level; it being necessary to choose a large modulus level to obtain a low falsealarm rate for a given $P_D$.

The addition of a signal integration circuit between the detector 38 and the threshold detecting circuit 37 changes the character of the distribution function in the general manner shown in FIG. 4B, where the threshold scale has been normalized by dividing by the number of pulses integrated. The effect of integration is to steepen the slopes of the curves, which, by the central limit theorem, approach the integrals of normal density functions as the degree of integration is increased. The noise-alone case leads to a distribution function which is approximately centered at the normalized threshold level $0.80\sigma$ where $\sigma$ is the standard deviation of the noise output from the MTI circuit, corresponding to the mean of the absolute value of a gaussian random variable. For the large signal case, the distribution function remains centered at a normalized threshold level of N/4. Thus, provided that N is chosen such that N/4 is greater than $0.80\sigma$, integration provides a means of increasing the probability of detection for a given false-alarm rate. By comparison, increase in signal level has no effect on this relationship, since it produces no significant change in the distribution function for the large signal case. The choice of modulus level, relative to the noise level, for a particular system is thus seen to depend primarily on the required probabilities of detection and false-alarm, and on the degree of signal integration that can be employed.

The false-alarm rate is generally of interest at a threshold setting corresponding to approximately 50 percent probability of detection for some specified S/N ratio. In the modulo-arithmetic case, the probability of detection is approximately independent of signal level for large signals. The probability density function at the detector output, for large signals, assuming antenna modulation and other factors are changing the input signal level significantly from pulse-to-pulse, is approximately that of a uniform distribution over the interval $0 \leq x < N/2$, where N is the modulus value.

The mean value of this distribution is N/4. The mean value of the integrated output, corresponding to the value of $x$ for 50 percent probability of detection, is thus $nN/4$, where $n$ is the number of samples integrated.

Figure 7:
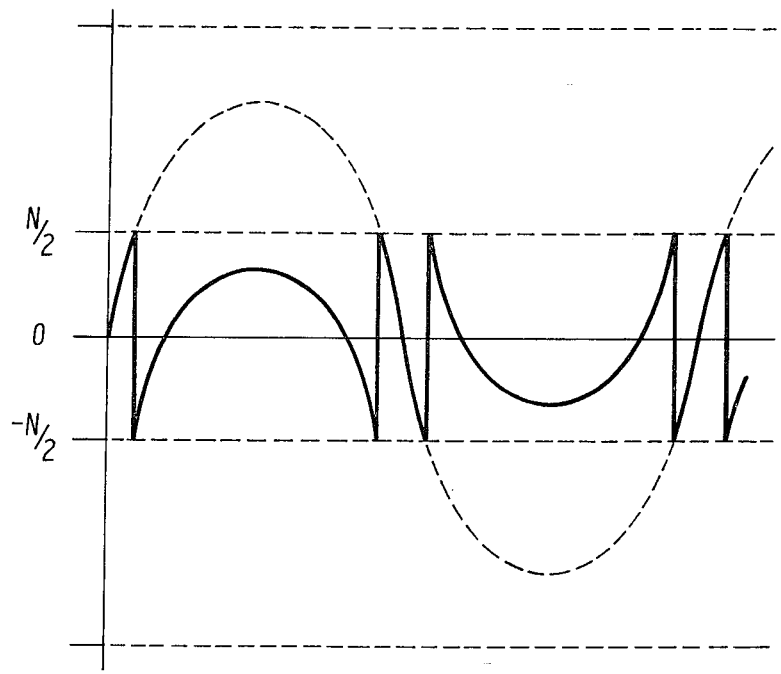
FIG. 7 shows graphically the output signal derived from the circuit of FIG. 3, corresponding to an input echo signal of interest, having an amplitude larger than the modulus range of the modulo-N components of the circuit of FIG. 3.

If the amplitude of the echo signals from relatively fast-moving targets exceeds the modulus N, these return signals will be "aliased" or folded about the levels N/2 and −N/2 by the modulo-N circuits in a manner shown in FIG. 7. This output signal, as derived by the MTI filter 30, will appear to the remaining portion of the circuit shown in FIG. 1 as noise, however, significantly, this noise-like output will be correctly detected to indicate the presence of a relatively fast-moving target of interest. Thus, the circuit shown in FIG. 3, whose components are adapted to process only a limited number of bits, is capable of detecting with the same degree of accuracy moving targets as that circuit shown in FIG. 2, whose structure is significantly more complex and is adapted to handle digital signals of a significantly greater number of bits. Thus, the number of bits of which the various circuit elements of the circuit of FIG. 3 must be capable of handling is determined solely by the minimum output signal level necessary to achieve the required probability of detection.

Figure 8A:
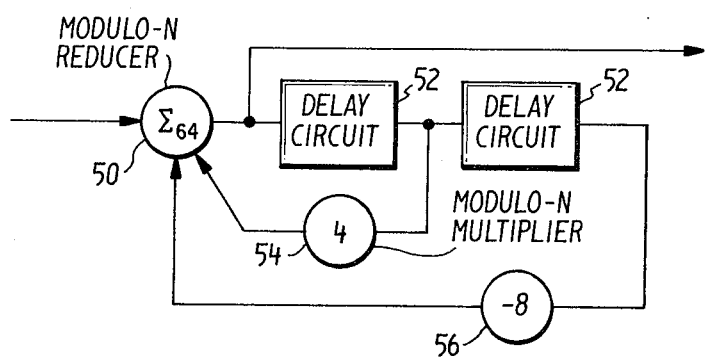
FIGS. 8A and 8B show alternative embodiments of feedback circuits incorporating modulo-N components.
Figure 8B:
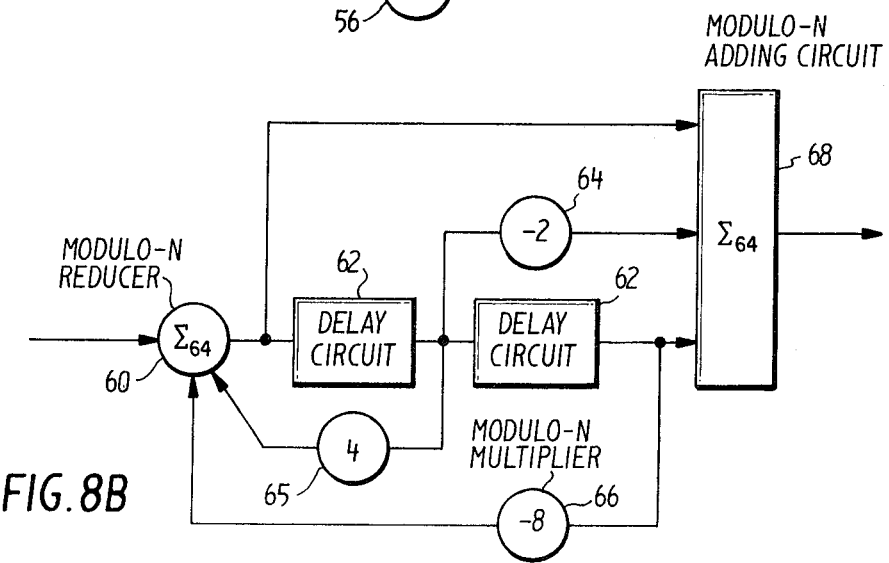

With regard to FIGS. 8A and 8B, there is shown a further illustrative embodiment of a modulo-arithmetic feedback filter circuit that may be incorporated into the radar system as shown in FIG. 1. With particular reference to FIG. 8A, there is shown a feedback, modulo-arithmetic filter, comprising a modulo-N reducer 50 for receiving a series of input echo signals, the output therefrom being applied to a plurality of delay circuits 52. The delayed echo signals are, in turn, applied respectively to modulo-N multipliers 54 and 56. As this circuit is denoted as a feedback filter circuit, the output from the modulo-N multipliers is, in turn, applied to the modulo-N reducer 50. As shown, the output of the feedback filter circuit is derived from the output of the modulo-N reducer 50. The impulse response of this filter, in its linear form, is the sequence 1, 4, 8, 0, −64, −256, −512, etc., with remaining elements all integer multiples of 64. When implemented modulo-64, the impulse response sequence therefore becomes 1, 4, 8, 000, etc., with all remaining elements at zero. The transfer function of this filter circuit is thus $1 + 4Z^{-1} + 8Z^{-2}$, with zeros at $Z=2\pm 2j$. When cascaded with the conventional three-pulse binomial canceler, two more zeros are added at $Z = 1$ and the combined transfer function is $1 + 2Z_{-1} + Z_{-2} - 12Z_{-3} + 8Z_{-4}$. The composite filter may take the illustrative form as shown in FIG. 8B including a modulo-N reducer 60 which is connected in series to a plurality of delay circuits 62. The delay circuits 62, in turn being applied respectively to modulo-N multipliers 65 and 66 and whose outputs are, in turn, applied to the modulo-N reducer 60. The output of the modulo-N reducer is applied to a modulo-N adding circuit 68. Further, input signals are derived from a modulo-N multiplier 64 and the second circuit 62. From theoretical considerations or from actual measurements, it may be seen that the feedback circuit as shown in FIG. 8B has a flatter response in the passband and therefore, is considered to be more useful than a conventional three-pulse canceler in many radar system applications.

Numerous changes may be made in the above-described apparatus and the different embodiments of the invention may be made without departing from he spirit thereof; therefore, it is intended that all matter contained in the foregoing description and in the accompanying drawings shall be interpreted as illustrative and not in a limiting sense.

What is claimed is:

1. In a moving target indicator radar system, a canceling circuit for suppressing echo signals from relatively slow-moving and/or stationary targets, said canceling circuit comprising:
    a. modulo-N reducer means for converting signals in accordance with a modulo-arithmetic transfer characteristic to provide an output signal whose amplitude is within the modulus N range;
    b. delay means for imparting a predetermined delay to the converted signals;
    c. modulo-N multiplier means for multiplying the delayed signals in accordance with selected coefficients and converting the multiplied signals in accordance with the modulo-arithmetic transfer characteristic to provide output signals indicative of the multiplied delayed signals whose amplitudes are within the modulus N range; and
    d. modulo-N summing means for summing the delayed multiplied signals and for converting the summed signals in accordance with the modulo-arithmetic transfer characteristic to provide a summed output signal whose amplitude is within the modulus N range, the coefficients of said modulo-N multiplier means being selected to suppress those signals of relatively slowly changing amplitude corresponding to relatively slow-moving and/or stationary targets and to provide an output signal corresponding to those signals derived from relatively fastmoving targets.

2. A canceling circuit as claimed in claim 1, wherein the summed signals is applied to detector means for detecting the presence of an echo signal corresponding to a relatively fast-moving object, to provide a signal indicative thereof, integration means for integrating the signal derived from said detector means, and threshold detector means for determining whether the amplitude of the integrated signal derived from said integrator means is above or below a predetermined level, the threshold level of said threshold detector means being set to indicate the presence of a relatively fast-moving target signal.

3. A canceling circuit as claimed in claim 1, wherein the modulo-arithmetic transfer characteristic controls the converted output signal of said modulo-N reducer means such that if the input signal thereto is less than $-N/2$, then the output signal equals $kN$, where $k$ is the smallest integer such that $kN > -N/2$ and, if the input signal is equal to or greater than $N/2$, then the output signal equals $-jN$, where $j$ is the smallest integer such that $-jN < N/2$.

4. A canceling circuit as claimed in claim 3, wherein the multiplied output signal of said modulo-N multiplier is controlled in accordance with the modulo-arithmetic transfer characteristic such that if the product $P_\infty$ of the echo signal and a selected coefficient is less than $-N/2$, then the product output signal $P_N$ of the modulo-N multiplier means if $P_\infty + kN$, where $k$ is the smallest integer such that $(P_\infty + kN) < -N/2$, and if the product signal $P_\infty \geq N/2$, then the product output signal $P_N$ of said modulo-N multiplier means equals $(P_\infty - jN)$, where $j$ is the smallest integer such that $(P_\infty - jN) < N/2$.

5. A canceling circuit as claimed in claim 3, wherein the transfer characteristic of said modulo-N summing means is chosen such that the summed input signals of said modulo-N summing means $\Sigma_\infty$ is less than $-N/2$, then the output signal of said modulo-N summing means $\Sigma_N$ is $(\Sigma_\infty + kN)$, where $k$ is the smallest integer such that $(\Sigma_\infty + kN) < -N/2$, and if the summed input signals of said modulo-N summing means $\Sigma_\infty \geq N/2$, then the output signal of said modulo-N summing $\Sigma_N = (\Sigma_\infty - jN)$ where $j$ is the smallest integer such that $(\Sigma_\infty - jN) < N/2$.

6. A canceling circuit as claimed in claim 2, wherein the predetermined level of said threshold detector means is set to distinguish against thermal noise inherent in the radar system and to permit an echo signal corresponding to a relatively fast-moving target to provide an output signal from said threshold detector means.

7. A canceling circuit as claimed in claim 6, wherein the predetermined level of said threshold detector means is set such that the probability of occurrence of thermal noise of an amplitude in excess of the predetermined level, is below a predetermined number.

8. A canceling circuit as claimed in claim 1, wherein the modulus N of said modulo-N reducer means, said modulo-N multiplier means, and said modulo-N summing means is selected such that the peak-to-peak value of a signal, corresponding to a minimum detectable moving-target echo signal, together with the effects of receiver thermal noise, lie substantially within the linear modulus range $-N/2$ to $N/2$.

9. A canceling circuit as claimed in claim 8, wherein the modulus N is chosen to be equal to or greater than 32.

10. A canceling circuit as claimed in claim 1, wherein each of said modulo-N reducer means, delay means, modulo-N multiplier means, and modulo-N summing means is of a five-bit data handling capability.

* * * * *